ns
Patented June 24, 1958

2,840,539

STABLE AQUEOUS EMULSION OF ALKYLDIPHENYLAMINES

James W. L. Fordham, Hazardville, Conn., assignor to Monsanto Chemical Company, St. Louis, Mo., a corporation of Delaware No Drawing. Application June 27, 1955
Serial No. 518,343

7 Claims. (Cl. 260—45.9)

The present invention relates to stable aqueous emulsions of alkyldiphenylamines and methods of preparing same. One of the most convenient methods of incorporating antioxidants in natural and synthetic rubbers it to add a stable aqueous emulsion of the antioxidant to the rubber latex before coagulating and isolating the rubbery polymer therefrom. The stable emulsions of the antioxidants are prepared employing sodium soaps as an emulsifying agent. This method cannot be used to incorporate the useful alkyldiphenylamine antioxidants in rubbery polymers because it is substantially impossible to prepare stable aqueous emulsions thereof employing sodium soaps as emulsifying agents.

Accordingly, it is an object of this invention to provide stable aqueous emulsions of alkyldiphenylamines.

Another object of this invention is to provide a method for preparing stable aqueous emulsions of alkyldiphenylamines.

A further object of this invention is to provide a method for incorporating alkyldiphenylamines in rubbery polymers which comprises preparing a stable aqueous emulsion of an alkyldiphenylamine, incorporating the stable aqueous emulsion of alkyldiphenylamine in a natural or synthetic rubber latex and coagulating and recovering the rubbery polymer from the latex.

It has been discovered that stable aqueous emulsions of alkyldiphenylamines can be prepared readily by adding an alkyldiphenylamine to an aqueous solution of a potassium salt of a fatty acid having at least 10 carbon atoms in its structure with stirring. It is surprising that this procedure gives a stable aqueous emulsion, since the additions of the same alkyldiphenylamine to aqueous solutions of supposedly equivalent sodium salts of the same fatty acids do not give stable aqueous emulsions, but rather only thick sticky coagulums of the alkyldiphenylamine in water.

The following example is set forth to more clearly illustrate the principle and practice of this invention to those skilled in the art. All parts are by weight.

EXAMPLE I

Part A

One hundred grams of heptyldiphenylamine is heated to 50° C. and 4.4 grams of stearic acid is dissolved therein. The resulting solution is poured slowly into 394 grams of water containing 1.1 gram of potassium hydroxide with vigorous stirring. A milky emulsion is obtained which is stable over a period of several days.

Part B

The emulsion of Part A is added to a natural rubber latex in an amount sufficient to give on a solids basis 1 part of heptyldiphenylamine per each 100 parts of rubber. The rubber is coagulated and recovered by conventional methods. The rubber exhibits excellent resistance to oxidation, thus demonstrating that the heptyldiphenylamine is uniformly incorporated throughout the polymer.

Part C

Part B is repeated except that the emulsion of heptyldiphenylamine is added to a latex of a 75/25 butadiene-styrene copolymer. Comparable results are obtained.

The alkyldiphenylamines which can be emulsified by the method of the present invention are known compounds and conform to the following formula:

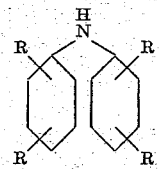

Where: Each R is selected from the group consisting of hydrogen and alkyl groups containing 5–12 carbon atoms, at least one and not more than two of the R's being alkyl groups. Examples of such alkyldiphenylamines include amyldiphenylamine, hexyldiphenylamine, heptyldiphenylamine, diisobutyldiphenylamine, triisobutyldiphenylamine, 2-ethylhexyldiphenylamine, decyldiphenylamine, di(2-ethylhexyl)diphenylamine, etc.

The emulsifiers employed in the process of the present invention are the potassium salts of fatty acids having at least 10 carbon atoms in their structure. Examples of such emulsifiers include the potassium salts of capric acid, undecylic acid, lauric acid, myristic acid, palmitic acid, oleic acid, stearic acid, mixed fatty acids derived from natural fats or oils such as tallow, cocoanut oil, soybean oil, cottonseed oil, etc.

The stable aqueous emulsions are prepared by adding the alkyldiphenylamine to an aqueous solution of the potassium salt of the fatty acid with stirring. It is desirable that the addition be carried out with vigorous stirring such as that obtained in a homogenizer. In a preferred embodiment of the invention the fatty acid is incorporated in the alkyldiphenylamine and this solution is then added to an aqueous solution of potassium hydroxide or an alkaline potassium salt such as potassium carbonate. This procedure forms a potassium soap at the locus of the alkyldiphenylamine and provides an exceptionally stable emulsion.

The quantity of potassium salt of the fatty acid employed in the preparation of the emulsion can be varied widely within the limits of from approximately 0.5 to 5.0 parts of potassium salt per 100 parts of alkyldiphenylamine emulsified. It is preferred to employ from 2.0 to 5.0 parts of potassium salt per 100 parts of alkyldiphenylamine. With lower quantities of emulsifier it is sometimes necessary to use more vigorous stirring and/or longer periods of agitation to obtain a stable emulsion. The alkyldiphenylamines are emulsified in an amount constituting from approximately 10 weight percent to approximately 50 weight percent of the emulsion, although by special techniques it is possible to operate both above and below these limits.

The above description and particularly the examples are set forth by way of illustration only and it will be obvious that many modifications and variations thereof can be made without departing from the spirit and scope of the invention herein disclosed.

What is claimed is:

1. The method of preparing a stable aqueous emulsion of monoheptyl diphenylamine which comprises adding 100 parts of monoheptyldiphenylamine with stirring to an aqueous solution containing 0.5 to 5.0 parts of a potassium salt of a fatty acid having 10–18 carbon atoms in its structure.

2. The method of preparing a stable aqueous emulsion of monoheptyldiphenylamine which comprises admixing 0.5 to 5.0 parts of a fatty acid having 10–18 carbon atoms in its structure with 100 parts of monoheptyldiphenylamine and adding the resulting mixture with stirring to an alkaline solution containing potassium ions.

3. A stable aqueous emulsion containing 100 parts of monoheptyldiphenylamine, said emulsion containing, as an emulsifying agent, 0.5 to 5.0 parts of a potassium salt of a fatty acid having 10–18 carbon atoms in its structure.

4. The method of preparing a rubbery diene polymer that is resistant to oxidation which comprises (1) preparing a stable aqueous emulsion of monoheptyldiphenylamine by the method of claim 1, (2) admixing a minor portion of the stable aqueous emulsion of the monoheptyldiphenylamine of step (1) with an aqueous dispersion of a rubbery diene polymer and (3) coagulating and separating the monoheptyldiphenylamine containing rubbery diene polymer from the aqueous dispersion of step (2).

5. The method of claim 1 in which 2.0 to 5.0 parts of the potassium salt of the fatty acid is employed per 100 parts of monoheptyldiphenylamine.

6. The method of claim 2 in which 2.0 to 5.0 parts of the fatty acid is employed per 100 parts of monoheptyldiphenylamine.

7. The emulsions of claim 3 which contain 2.0 to 5.0 parts of the potassium salt of the fatty acid per 100 parts of monoheptyldiphenylamine.

References Cited in the file of this patent

UNITED STATES PATENTS

| | | |
|---|---|---|
| 2,060,138 | Taylor | Nov. 10, 1936 |
| 2,379,769 | Vinograd | July 3, 1945 |
| 2,432,831 | Sturgis et al. | Dec. 16, 1947 |
| 2,445,734 | Carl | July 20, 1948 |
| 2,530,769 | Hollis | Nov. 21, 1950 |

OTHER REFERENCES

"Handbook of Material Trade Names," Zimmerman et al. (1953 edition), page 183 (Dresinate 731), copy in Division 50.